US012436806B2

(12) United States Patent
He et al.

(10) Patent No.: US 12,436,806 B2
(45) Date of Patent: Oct. 7, 2025

(54) GLOBAL SERVICE CATALOG FOR PROVISIONING SERVICES ON A MULTI-CLUSTER SERVICE MESH OF A MULTI-CLUSTER COMPUTING ENVIRONMENT

(71) Applicant: Dell Products L.P., Round Rock, TX (US)

(72) Inventors: Xuebin He, Westwood, MA (US); Victor Fong, Melrose, MA (US)

(73) Assignee: Dell Products L.P., Round Rock, TX (US)

( * ) Notice: Subject to any disclaimer, the term of this patent is extended or adjusted under 35 U.S.C. 154(b) by 894 days.

(21) Appl. No.: 17/682,114

(22) Filed: Feb. 28, 2022

(65) Prior Publication Data

US 2023/0273825 A1    Aug. 31, 2023

(51) Int. Cl.
*G06F 9/50* (2006.01)

(52) U.S. Cl.
CPC .................................. *G06F 9/5027* (2013.01)

(58) Field of Classification Search
CPC ........................................................ G06F 9/5027
See application file for complete search history.

(56) References Cited

U.S. PATENT DOCUMENTS

| | | | | |
|---|---|---|---|---|
| 10,425,350 | B1 * | 9/2019 | Florissi | H04L 47/762 |
| 2017/0187785 | A1 * | 6/2017 | Johnson | H04L 51/42 |
| 2019/0273798 | A1 * | 9/2019 | Lairsey | H04L 67/10 |
| 2020/0050494 | A1 * | 2/2020 | Bartfai-Walcott | G06F 9/5083 |
| 2020/0127980 | A1 * | 4/2020 | Smith | H04L 63/0428 |

OTHER PUBLICATIONS

S. Rajagopalan et al., "Istio: A Modern Service Mesh," https://istio.io/talks/istio_talk_gluecon_2017.pdf, Apr. 12, 2017, 36 pages.
The Kubernetes Authors, "Kubernetes Components," https://kubernetes.io/docs/concepts/overview/components/, Oct. 17, 2021, 3 pages.
The Kubernetes Authors, "The Kubernetes API," https://kubernetes.io/docs/concepts/overview/kubernetes-api/, Nov. 23, 2021, 3 pages.
L. Sun et al., "Istio Explained: Getting Started with Service Mesh," https://ibm.biz/oreilly-istio-tech, Nov. 2019, 91 pages.
Istio Authors, "What is Istio?" https://istio.io/latest/, Accessed Feb. 10, 2022, 5 pages.

* cited by examiner

*Primary Examiner* — Jacob D Dascomb
(74) *Attorney, Agent, or Firm* — Ryan, Mason & Lewis, LLP (57) ABSTRACT

An apparatus comprises a processing device configured to identify one or more dependent services for a workload deployed in a first computing cluster of a multi-cluster computing environment and to select, utilizing a global service catalog aggregating service information for sets of available services offered by at least two computing clusters of the multi-cluster computing environment, a second computing cluster of the multi-cluster computing environment to utilize for provisioning at least a given one of the one or more dependent services for the workload. The processing device is further configured to provision the given dependent service on a multi-cluster service mesh associated with the multi-cluster computing environment by configuring the multi-cluster service mesh to permit access by the workload on the first computing cluster of the multi-cluster computing environment to the given dependent service on the second computing cluster of the multi-cluster computing environment.

20 Claims, 6 Drawing Sheets

GLOBAL SERVICE CATALOG FOR PROVISIONING SERVICES ON A MULTI-CLUSTER SERVICE MESH OF A MULTI-CLUSTER COMPUTING ENVIRONMENT

FIELD

The field relates generally to information processing, and more particularly to managing information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant technical problems can arise in the management of services in cloud-based information processing systems. Similar technical problems arise in other types of information processing systems that include clusters of processing devices.

SUMMARY

Illustrative embodiments of the present disclosure provide techniques for provisioning services on a multi-cluster service mesh of a multi-cluster computing environment utilizing a global service catalog.

In one embodiment, an apparatus comprises at least one processing device comprising a processor coupled to a memory. The at least one processing device is configured to perform the steps of identifying one or more dependent services for a workload deployed in a first one of two or more computing clusters of a multi-cluster computing environment and selecting, utilizing a global service catalog aggregating service information for sets of available services offered by at least two of the two or more computing clusters of the multi-cluster computing environment, a second one of the two or more computing clusters of the multi-cluster computing environment to utilize for provisioning at least a given one of the one or more dependent services for the workload. The at least one processing device is further configured to perform the step of provisioning the given dependent service on a multi-cluster service mesh associated with the multi-cluster computing environment, wherein provisioning the given dependent service on the multi-cluster service mesh comprises configuring the multi-cluster service mesh to permit access by the workload on the first one of the two or more computing clusters of the multi-cluster computing environment to the given dependent service on the second one of the two or more computing clusters of the multi-cluster computing environment.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Software architecture may be designed in various ways. In some architectures, software may provide a number of functions in the form of a single, monolithic application. A "monolithic" application refers to a single-tiered, tightly-coupled software application in which various elements of the software architecture (e.g., a user interface, database access, processing logic, etc.) are combined into a single program, usually on a single platform. In software engineering, a monolithic application describes a software application that is designed without modularity. In general, modularity of software elements in a software architecture is desirable, as modularity supports reuse of portions of application logic while also enabling efficient maintenance and development (e.g., by enabling repair and replacement of parts of an application without requiring upgrading the entire application).

Monolithic applications may suffer from disadvantages relating to innovation, manageability, resiliency and scalability, particularly in computing environments such as cloud computing environments, datacenters, and converged infrastructure. As an alternative to such monolithic applications, some software architectures provide different functions in the form of microservices. In a microservice architecture, a single application is developed as a suite of small microservices. A microservice can run on its own process and communicate with other systems or services through a lightweight mechanism, such as a hypertext transport protocol (HTTP) resource application programming interface (API) or communication API provided by an external system. Microservices in some embodiments are assumed to be independently deployable using fully automated deployment mechanisms.

In some embodiments, microservices are small, independent and composable services that can be accessed through Representational State Transfer (RESTful) APIs. Thus, a single monolithic application may be broken down into separate and independent microservices for discrete functions, providing potential benefits in innovation, manageability, resiliency and scalability. Innovation benefits may be provided through the ability to develop and deploy new versions of microservices more rapidly as compared to a single monolithic application. Manageability benefits may be realized as the code used is smaller and thus easier to understand, facilitating changes and deployments. Resiliency benefits may be realized as functionality may be distributed across multiple microservices, such that failure or downtime of one microservice does not result in loss of functionality provided by other microservices. Scalability benefits may be realized in that microservices can be deployed and scaled independently of one another.

Microservices-based software architectural design structures an application as a collection of loosely coupled services. Microservices-based software architectures may be viewed as a variant of a service-oriented architecture that focuses on fine-grained services, lightweight protocols, etc. A microservices architecture enables individual microservices to be deployed and scaled independently, such as via software containers. Individual microservices can be worked on in parallel by different teams, may be built in different programming languages, and have continuous delivery and deployment flows. As development moves toward cloud-native approaches, it is desired to decompose, disintegrate or otherwise separate existing monolithic applications into microservices. Advantageously, microservices allow software developers of an enterprise to work independently and communicate together. Thus, an enterprise system can achieve better efficiency and resiliency with microservices as compared with monolithic applications, while providing similar or better results.

Figure 1:
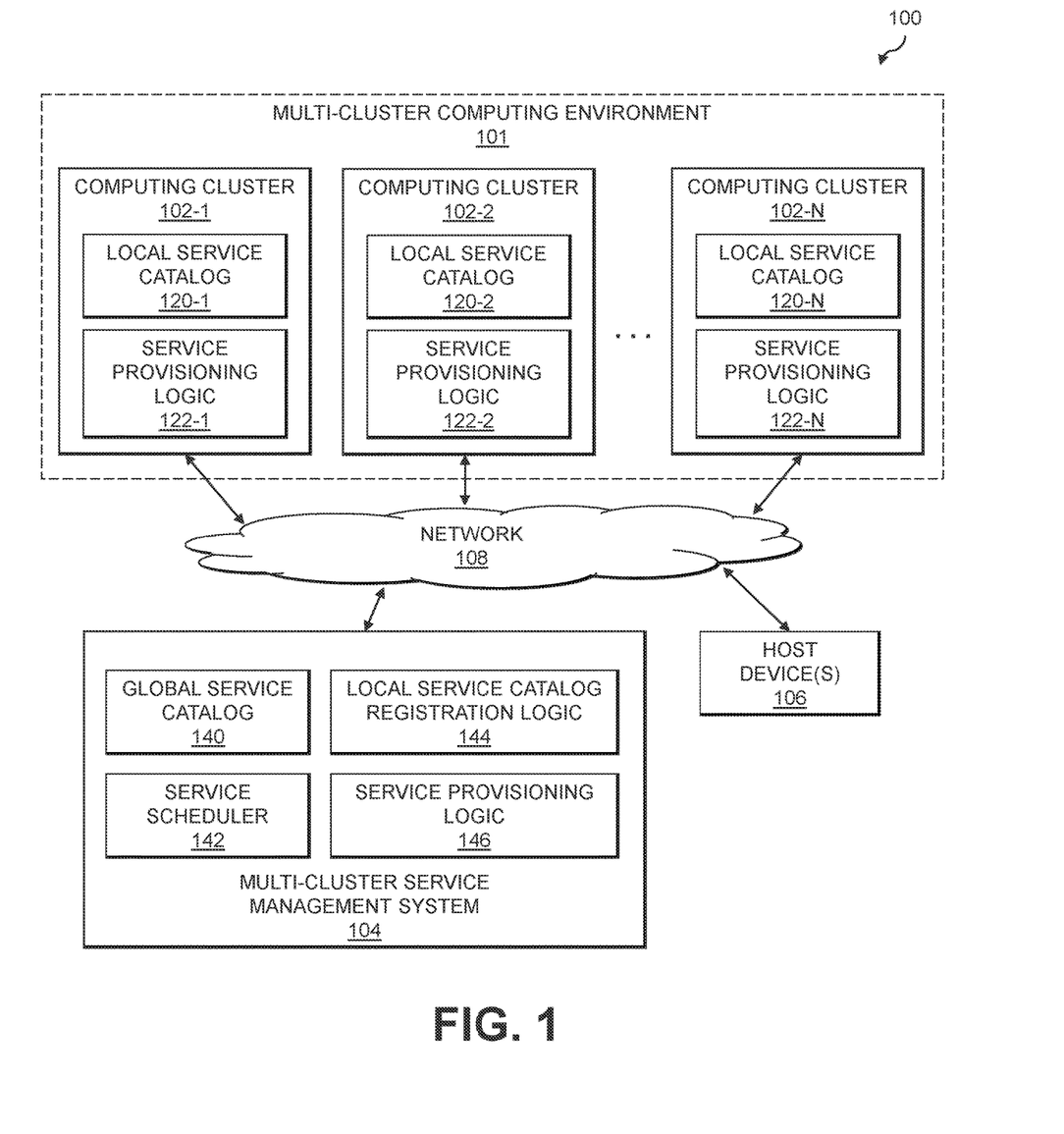
FIG. 1 is a block diagram of an information processing system configured for provisioning services on a multi-cluster service mesh of a multi-cluster computing environment utilizing a global service catalog in an illustrative embodiment.

FIG. 1 shows an information processing system 100 configured in accordance with an illustrative embodiment for provisioning services on a multi-cluster service mesh of a multi-cluster computing environment 101. The multi-cluster computing environment 101 comprises a set of computing clusters 102-1, 102-2, . . . 102-N(collectively, computing clusters 102) which are configured for communication with a multi-cluster service management system 104 over network 108. Also coupled to the network 108 is a set of one or more host devices 106. The host devices 106 may run workloads on the computing clusters 102 of the multi-cluster computing environment 101, where each of such workloads may utilize one or more dependent services (e.g., microservices) which also run on the computing clusters 102 of the multi-cluster computing environment 101. The workloads and their dependent services, as will be described in further detail below, may run on different ones of the computing clusters 102 of the multi-cluster computing environment 101. The multi-cluster service management system 104 is configured to facilitate the provisioning and deployment of workloads and their dependent services on the computing clusters 102 of the multi-cluster computing environment 101.

The computing clusters 102, the multi-cluster service management system 104 and the host devices 106 illustratively comprise respective computers, servers or other types of processing devices capable of communicating with one another via the network 108. For example, at least a subset of the host devices 106 and the multi-cluster service management system 104 may be implemented as respective virtual machines of a compute services platform or other type of processing platform. The computing clusters 102 of the multi-cluster computing environment 101 illustratively provide compute services such as execution of one or more applications or workloads and their dependent services on behalf of each of one or more users associated with respective ones of the host devices 106.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The multi-cluster service management system 104 implements functionality for provisioning and deploying workloads and their dependent services on the computing clusters 102 of the multi-cluster computing environment 101 utilizing a global service catalog 140 and service scheduler 142. The global service catalog 140 utilizes local service catalog registration logic 144 to register local service catalogs 120-1, 120-2, . . . 120-N(collectively, local service catalogs 120) implemented by the computing clusters 102 in the multi-cluster computing environment 101. Each of the computing clusters 102 may offer different types of services, with information on such services being made part of their associated local service catalogs 120. The local service catalog registration logic 144 of the multi-cluster service management system 104 registers the local service catalogs 120 with the global service catalog 140, which can aggregate information regarding the services offered by different ones of the computing clusters 102 of the multi-cluster computing environment 101. Such aggregated information is used by the service scheduler 142 for determining where to deploy workloads and their dependent services across the computing clusters 102 of the multi-cluster computing environment 101.

The service scheduler 142 utilizes service provisioning logic 146 for provisioning and deploying workloads and their dependent services on the computing clusters 102 of the multi-cluster computing environment 101. As shown in FIG. 1, each of the computing clusters 102 implements an instance of service provisioning logic 122-1, 122-2, . . . 122-N(collectively, service provisioning logic 122) for facilitating such provisioning and deployment of workloads and their dependent services with the service provisioning logic 146 of the multi-cluster service management system 104.

It should be noted that while FIG. 1 shows an embodiment where each of the computing clusters 102 implements a local service catalog 120 and service provisioning logic 122, this is not a requirement. For example, one or more of the computing clusters 102 of the multi-cluster computing environment 101 may not implement a local service catalog instance. Further, while in the FIG. 1 embodiment the multi-cluster service management system 104 and host devices 106 are shown as being implemented outside of the multi-cluster computing environment 101, this is not a requirement. In other embodiments, the multi-cluster service management system 104 and/or one or more of the host devices 106 may be implemented at least partially internal to the multi-cluster computing environment 101 (e.g., on one of more of the computing clusters 102 thereof, as separate standalone servers, computers or other processing devices that execute within the multi-cluster computing environment 101, etc.).

At least portions of the functionality of the local service catalogs 120, the service provisioning logic 122, the global service catalog 140, the service scheduler 142, the local service catalog registration logic 144, and the service provisioning logic 146 may be implemented at least in part in the form of software that is stored in memory and executed by a processor.

The computing clusters 102, the multi-cluster service management system 104 and the host devices 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The computing clusters 102, the multi-cluster service management system 104 and the host devices 106 (or one or more components thereof such as the local service catalogs 120, the service provisioning logic 122, the global service catalog 140, the service scheduler 142, the local service catalog registration logic 144, and the service provisioning logic 146) may be implemented on respective distinct processing platforms, although numerous other arrangements are possible. For example, in some embodiments at least portions of one or more of the host devices 106 and the multi-cluster service management system 104 and/or one or more of the computing clusters 102 are implemented on the same processing platform. The multi-cluster service management system 104 can therefore be implemented at least in part within at least one processing platform that implements at least a subset of the host devices 106. Further, as noted above, the multi-cluster service management system 104 and/or one or more of the host devices 106 may be implemented at least partially internal to the multi-cluster computing environment 101 (e.g., on one or more of the computing clusters 102 thereof).

The network 108 may be implemented using multiple networks of different types. For example, the network 108 may comprise a portion of a global computer network such as the Internet, although other types of networks can be part of the network 108 including a wide area network (WAN), a local area network (LAN), a satellite network, a telephone or cable network, a cellular network, a wireless network such as a WiFi or WiMAX network, a storage area network (SAN), or various portions or combinations of these and other types of networks. The network 108 in some embodiments therefore comprises combinations of multiple different types of networks each comprising processing devices configured to communicate using Internet Protocol (IP) or other related communication protocols.

The computing clusters 102, the multi-cluster service management system 104 and the host devices 106 in some embodiments may be implemented as part of a cloud-based system. The computing clusters 102, the multi-cluster service management system 104 and the host devices 106 can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks including network 108.

The term "processing platform" as used herein is intended to be broadly construed so as to encompass, by way of illustration and without limitation, multiple sets of processing devices and one or more associated storage systems that are configured to communicate over one or more networks. For example, distributed implementations of the computing clusters 102, the multi-cluster service management system 104 and the host devices 106 are possible, in which certain ones of the host devices 106 and/or computing clusters 102 reside in one data center in a first geographic location while other ones of the host devices 106 and/or computing clusters 102 reside in one or more other data centers in at least a second geographic location that is potentially remote from the first geographic location. The multi-cluster service management system 104 may be implemented at least in part in the first geographic location, the second geographic location, and one or more other geographic locations. Thus, it is possible in some implementations of the system 100 for different ones of the host devices 106, the computing clusters 102 and the multi-cluster service management system 104 to reside in different data centers.

Numerous other distributed implementations of computing clusters 102, the multi-cluster service management system 104 and the host devices 106 are possible. Accordingly, computing clusters 102, the multi-cluster service management system 104 and the host devices 106 can also be implemented in a distributed manner across multiple data centers.

Additional examples of processing platforms utilized to implement portions of the system 100 in illustrative embodiments will be described in more detail below in conjunction with FIGS. 5 and 6.

It is to be understood that the particular set of elements shown in FIG. 1 for provisioning services on a multi-cluster service mesh of the multi-cluster computing environment 101 utilizing the global service catalog 140 is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
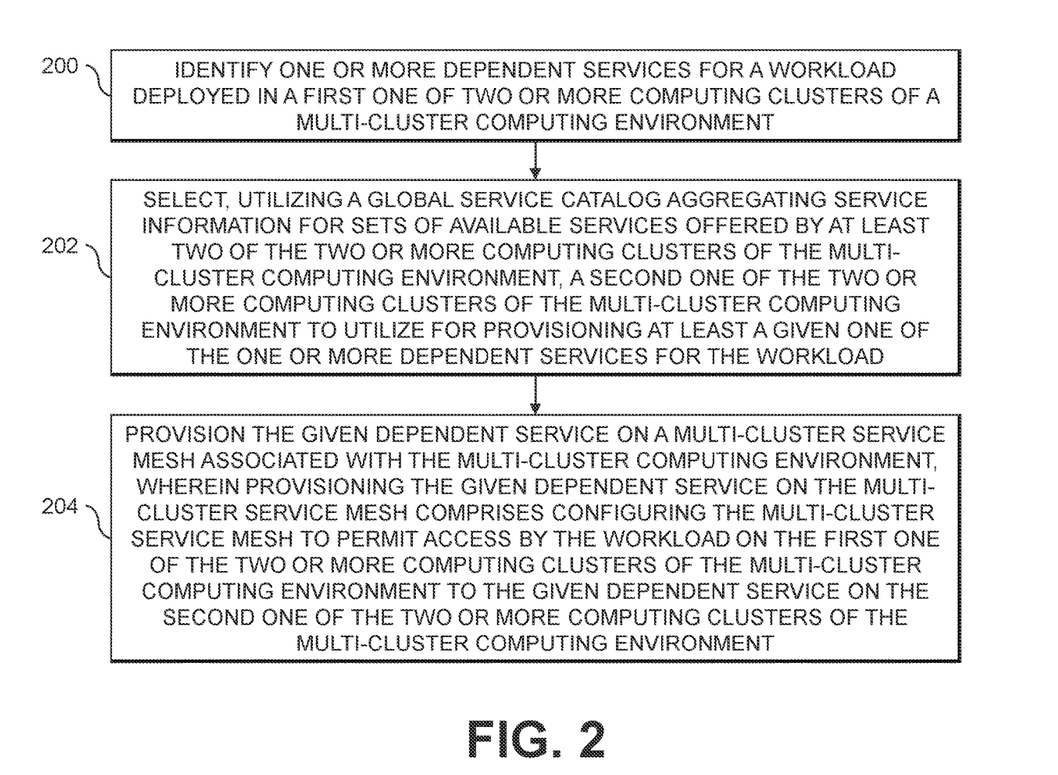
FIG. 2 is a flow diagram of an exemplary process for provisioning services on a multi-cluster service mesh of a multi-cluster computing environment utilizing a global service catalog in an illustrative embodiment.

An exemplary process for provisioning services on a multi-cluster service mesh of a multi-cluster computing environment utilizing a global service catalog will now be described in more detail with reference to the flow diagram of FIG. 2. It is to be understood that this particular process is only an example, and that additional or alternative processes for provisioning services on a multi-cluster service mesh of a multi-cluster computing environment utilizing a global service catalog may be used in other embodiments.

In this embodiment, the process includes steps 200 through 204. These steps are assumed to be performed by or using the local service catalogs 120, the service provisioning logic 122, the global service catalog 140, the service scheduler 142, the local service catalog registration logic 144, and the service provisioning logic 146. The process begins with step 200, identifying one or more dependent services for a workload deployed in a first one of two or more computing clusters (e.g., computing clusters 102) of a multi-cluster computing environment (e.g., multi-cluster computing environment 101). In step 202, a global service catalog (e.g., global service catalog 140) that aggregates service information for sets of available service offered by at least two of the two or more computing clusters of the multi-cluster computing environment is utilized to select a second one of the two or more computing clusters of the multi-cluster computing environment to utilize for provisioning at least a given one of the one or more dependent services for the workload. The given dependent service may comprise a given service type, and step 202 may comprise selecting the second one of the two or more computing clusters of the multi-cluster computing environment from among at least two of the two or more computing clusters of the multi-cluster computing environment offering services of the given service type. The second one of the two or more computing clusters of the multi-cluster computing environment may be selected based at least in part on various factors, such as latency to the first one of the two or more computing clusters of the multi-cluster computing environment where the workload is deployed.

The aggregated service information may be collected from local service catalogs (e.g., local service catalogs 120) associated with at least two of the two or more computing clusters of the multi-cluster computing environment. Such local service catalogs may be registered with the global service catalog, where such registration includes, for a given one of the local service catalogs associated with a given one of the at least two of the two or more computing clusters of the multi-cluster computing environment, parsing a registration request for the given local service catalog. The registration request may specify an operator of the given one of the two or more computing clusters of the multi-cluster computing environment, a network address of the given local service catalog, and a private key of a key pair generated for establishing secure connection between the given local service catalog and the global service catalog. The global service catalog may periodically poll the local service catalogs that maintain information regarding sets of available services offered by the at least two of the two or more computing clusters of the multi-cluster computing environment to update the sets of available services offered by the at least two of the two or more computing clusters of the multi-cluster computing environment.

The aggregated service information of the global service catalog may comprise one or more consolidated service entries. At least a given one of the one or more consolidated service entries may be associated with a given service type. The given service type may comprise at least one of: a database service type; a storage service type; a security service type; a hardware accelerator service type. The given consolidated service entry may identify at least two of the two or more computing clusters of the multi-cluster computing environment that offer services of the given service type. The given consolidated service entry may also or alternatively identify at least two service configurations of the given service type offered by at least one of the two or more computing clusters of the multi-cluster computing environment. The at least two service configurations may comprise two or more different guaranteed levels of service of the given service type offered by the at least one of the two or more computing clusters of the multi-cluster computing environment.

In step 204, the given dependent service is provisioned on a multi-cluster service mesh associated with the multi-cluster computing environment. Step 204 comprises configuring the multi-cluster service mesh to permit access by the workload on the first one of the two or more computing clusters of the multi-cluster computing environment to the given dependent service on the second one of the two or more computing clusters of the multi-cluster computing environment. Step 204 may further comprise generating a key pair for the workload, wherein the generated key pair comprises a private key and a public key, providing the private key of the generated key pair to the workload, and providing the public key and a given identifier of the workload to the given dependent service. Step 204 may further or alternatively comprise: receiving, from a local service catalog associated with the second one of the two or more computing clusters of the multi-cluster computing environment, one or more credentials for the given dependent service encrypted utilizing a public key of a key pair associated with the local service catalog; decrypting, at the global service catalog, the one or more credentials for the given dependent service utilizing a private key of the key pair associated with the local service catalog, the private key being previously provided to the global service catalog during registration of the local service catalog; and injecting the decrypted one or more credentials into the first one of the two or more computing clusters of the multi-cluster computing environment where the workload is deployed.

In some embodiments, steps 202 and 204 are repeated dynamically in response to various conditions, such as detecting one or more changes in available resources of at least one of the two or more computing clusters of the multi-cluster computing environment, detecting migration of the workload (e.g., from (i) being deployed in the first one of the two or more computing clusters of the multi-cluster computing environment to (ii) being deployed in at least one other one of the two or more computing clusters of the multi-cluster computing environment), etc.

With growing trends of 5G and edge computing, workloads are being moved away from traditional data centers and cloud computing platforms to places that are closer to the end users to improve user experience. Moving workloads between different facilities (e.g., different computing sites, including among data centers, cloud computing platforms, edge computing sites, etc.) will thus become more common. There is a need for technical solutions that can provide support for moving workloads and their dependent services, enabling the dependent services for workloads to be scheduled and run at multiple different facilities (e.g., which may be the same as or different than their associated workloads).

Various workloads may depend on or otherwise utilize various different types of services, such as database services, storage services, acceleration services, etc. Moving workloads between facilities requires technical solutions for providing dependent services in corresponding environments. As dynamic scheduling approaches are adopted for workload placement (e.g., including for edge and 5G deployments), there is a need for technical solutions for managing dependent services of the workloads. In some embodiments, a service mesh and service broker are utilized for facilitating management of dependent services.

Dependent services are normally deployed in the same environment as the consumers (e.g., workloads) of the services in order to reduce operational cost and improve latency between the workloads and their dependent services. Being in the same environment makes it easier for workloads to consume dependent services (e.g., avoiding the need for handling firewall and authentication issues).

There are various technical problems associated with handling of workloads and dependent services in multi-cluster computing environments. In a multi-cluster computing environment, each computing cluster may be operated by a different provider. The barriers between two computing clusters require operators or developers to manually resolve each case. Multi-cluster computing environments also make service provisioning a more complicated task. When a workload is moved from a first computing cluster to a second computing cluster, the dependent services will typically be moved along with the workload from the first computing cluster to the second computing cluster. There may be other options, however. Consider, as an example, a database service that has been created and used for many years. In some cases, moving the database service to another computing cluster may not be the best choice (e.g., as extra latency may not be critical for the workload, considering the cost associated with movement of the dependent service between computing clusters). In other cases, a dependent service should be moved from its original computing cluster (e.g., where latency is important to user experience) to a target computing cluster. However, due to limited resources in the target computing cluster, moving the dependent service into the target computing cluster may not be cost efficient. A technical solution in such an instance would be to run the dependent services in another computing cluster that is close to the target computing cluster (e.g., with good latency characteristics and better cost efficiency than running the dependent service directly in the target computing cluster). There are thus various technical problems with service provisioning in multi-cluster computing environments, as compared with single-cluster computing environments (e.g., as more factors are involved).

Multi-cluster computing environments can also pose security threats. Accessing dependent services in another computing cluster (e.g., in a different facility) often involves manual configuration effort by IT departments (e.g., to open a port in a firewall, such as where the port is a non-traditional port). Further, exposing an existing dependent service that was previously only available internally within one computing cluster can require various manual configuration (e.g., assigning new IP addresses or domains, etc.). In addition, scheduling workloads is not always a static one-time process and may instead be a continuous process based on various factors (e.g., user input, changes in related environments, etc.). Further, continuously punching "holes" (e.g., opening ports in firewalls or other tasks that expose potential attack vectors for malicious actors) and exposing internal services to other computing clusters will intensify the efforts required for IT operators and pose security threats.

Multi-cluster computing environments can also pose threats to credential management systems. To access dependent services in different facilities, credentials are often required. The task of managing such credentials while workloads are moved across different computing clusters without compromising the credentials presents technical problems and challenges for both operators and developers.

Illustrative embodiments provide technical solutions for service selection and placement among multiple computing sites (e.g., multiple computing clusters, including cloud computing platforms, edge computing sites, data centers, etc.). The technical solutions described herein may utilize a global service catalog, a customized local service catalog, and a customized service broker API. The customized local service catalog for a given computing site or cluster may be used to provision third-party services (e.g., dependent services) for workloads that are running within that computing site or clusters, or potentially in a different computing site or cluster. For example, a Kubernetes container orchestration system may utilize a service catalog for providing third-party services to workloads running in a Kubernetes environment. Developers can use the Kubernetes API or command line interface (CLI) to provision service instances in the service catalog, and for binding the provisioned services to applications. In some embodiments, a customized local service catalog is provided that enables provisioning of services, binding services to applications or other workloads, collecting metrics data, and generating public key infrastructure (PKI) keys for the binding of provisioned services to applications or other workloads.

Some embodiments also utilize a customized service broker API. A service broker API may be used to facilitate management and delivery of services. Kubernetes, for example, utilizes a service broker API in its service catalog. The customized service broker API utilized in some embodiments provides additional functionality for adding metrics data into the bodies of service requests.

The global service catalog provides functionality for communicating with one or more customized local service catalogs, deployed in different computing clusters, which are registered to the global service catalog. The global service catalog can collect service information from the customized local service catalogs, where the service information comprises information regarding the available services on each computing cluster. The global service catalog can also send requests to the customized local service catalogs to provision new services.

Figure 3:
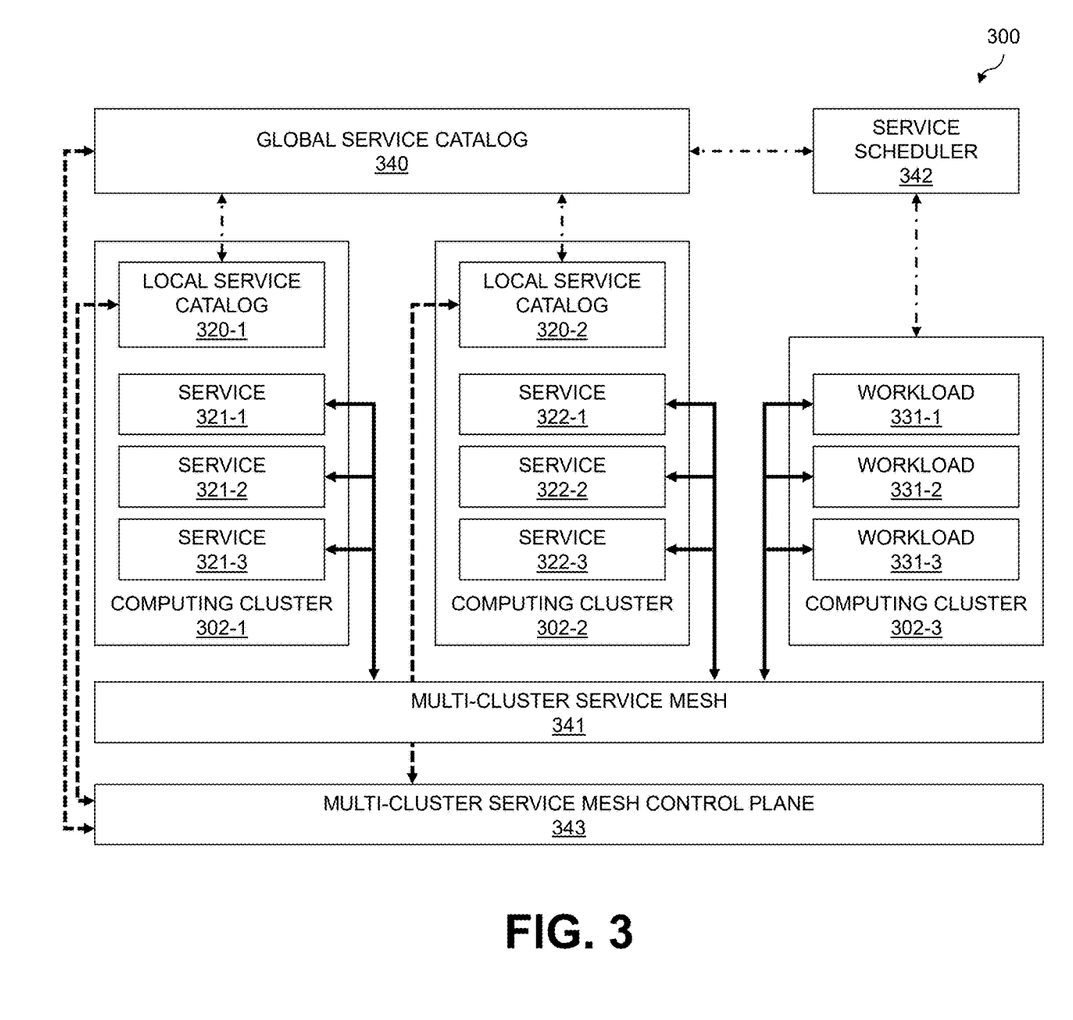
FIG. 3 shows a global service catalog and local service catalogs for service provisioning on computing clusters of a multi-cluster computing environment in an illustrative embodiment.

FIG. 3 shows an example architecture 300, including a set of computing clusters 302-1, 302-2, and 302-3 (collectively, computing clusters 302). The computing clusters 302-1 and 302-2 implement respective local customized service catalogs 320-1 and 320-2 (collectively, local service catalogs 320). The computing clusters 302-1 and 302-2 also run respective sets of services 321-1, 321-2, and 321-3 (collectively, services 321) and services 322-1, 322-2, and 322-3 (collectively, services 322) which may be consumed by or otherwise utilized by a set of workloads 331-1, 331-2, and 331-3 (collectively, workloads 331) running on computing cluster 302-3. The services 321 and 322 may be scheduled (e.g., provisioned and bound to the workloads 331) utilizing a service scheduler 342 coupled to the global service catalog 340 and the computing cluster 302-3. The architecture 300 also includes a multi-cluster service mesh 341 (e.g., of the services 321 and 322 running on the computing clusters 302-1 and 302-2, and the workloads 331 running on the computing cluster 302-3). The local service catalogs 320 are shown in communication with a multi-cluster service mesh control plane 343.

As illustrated in FIG. 3, each of the computing clusters 302 can provide a place for provisioning services (e.g., services 321 and 322), for running workloads (e.g., workloads 331), or combinations thereof. While FIG. 3 shows an example where each of the computing clusters 302 runs either a set or services or a set of workloads, this is not a requirement. In other embodiments, a single one of the computing clusters 302 may run one or more services and one or more workloads. The computing clusters 302 utilize the multi-cluster service mesh 341 as an underlying way of secure communication therebetween. In some embodiments, the multi-cluster service mesh 341 utilizes a suitably modified implementation of an Istio® service mesh. The Istio service mesh, for example, is used as the default service mesh in Kubernetes, and supports multi-cluster service mesh environments. The global service catalog 340 can be deployed in any one of the computing clusters 302, or in a dedicated location (e.g., a dedicated server) where the computing clusters 302 are able to establish a secure connection with the global service catalog 340 as part of the multi-cluster service mesh control plane 343.

The multi-cluster service mesh 341 enables services 321 and 322, as well as workloads 331, to connect to each other without requiring that each of the services 321 and 322, and each of the workloads 331, know the exact connection details of one another (e.g., IP or other network addresses, secrets, etc.). The multi-cluster service mesh 341 may implement an application layer proxy that facilitates the development and deployment of workloads that have dependent services (e.g., third-party services). The multi-cluster service mesh 341 enables the services 321 and 322 and the workloads 331 to connect to each other. As will be described in further detail below, secrets or other credentials may be added to the multi-cluster service mesh 341 to make sure that only specific workloads 331 can access specific ones of the services 321 and 322.

The local service catalogs 320 and the global service catalog 340 may be used for implementing a marketplace for services. The number and types of such services may vary. Non-limiting examples of the services include database services, block storage services, authentication services, accelerator services, security services, etc. Conventionally, a marketplace (e.g., a local service catalog) can only serve the computing cluster where the marketplace is deployed. The technical solutions described herein deploy the global service catalog 340 that can provide a union of all available marketplaces (e.g., the local service catalogs 320 on computing clusters 302-1 and 302-2) together as one, to facilitate running workloads (e.g., workloads 331) which utilize dependent services (e.g., services 321 and 322) across the multiple computing clusters 302.

To register the local service catalogs 320 with the global service catalog 340, a registration request may be submitted to an endpoint of the global service catalog 340. The registration request may follow a predefined format. In some embodiments, the registration request may be a Hypertext Transfer Protocol (HTTP) POST method to the endpoint of the global service catalog 340 (e.g., to "/v1/catalog" of the global service catalog 340). The registration request may therefore use the syntax:

POST/v1/catalog

The body of the registration request will provide various information associated with a given one of the local service catalogs 320 that is the subject of the registration request. Such information may include, for example, an address of the given local service catalog 320, a provider of the given local service catalog 320, a private key of the given local service catalog 320, etc. In some embodiments, the body of the registration request utilizes a JavaScript Object Notation (JSON) format as follows:

```
{
    "provider": "Provider_Name",
    "address": "catalog.local_location.provider_name.com"
    "private_key": "ABCDE12345"
}
```

The private key of the given local service catalog 320 in some embodiments is generated and utilized solely for the purpose of establishing a secure connection between the global service catalog 340 and the given local service catalog 320.

Once the global service catalog 340 receives the registration request from the given local service catalog 320, the global service catalog 340 connects to the given local service catalog 320 (e.g., using information from the body of the registration request) to retrieve information about the services that are part of the given local service catalog 320. The global service catalog 340 will then update its own records with any new services, if necessary. Since services can be added and removed, and existing services may be modified (e.g., to change their performance or other characteristics), the global service catalog 340 may poll information from each of the registered local service catalogs 320 (e.g., periodically, at some user-specified frequency, etc.).

The global service catalog 340 may also aggregate service information across the registered local service catalogs 320, as there may be local service catalogs 320 in more than one of the computing clusters 302 that provide a same type of service. For example, there may be multiple ones of the computing clusters 302 that provide a given type of database service (e.g., a MySQL® database service), with each of such multiple computing clusters 302 providing an instance of the given type of database service with its own characteristics. A first instance of the given type of database service may have a higher limit on active connections than a second instance of the given type of database service, while the first instance of the given type of database service has a higher cost than the second instance of the given type of database service. Further, even within a same one of the local service catalogs 320, there may be different plans for the given type of database service (e.g., a silver plan with 100 gigabytes (GB) of storage, a gold plan with 500 GB of storage, etc.). For each type of service, the global service catalog 340 will aggregate all plans of all the local service catalogs 320 with additional information (e.g., the provider of that plan), and show such plans under a single service type (e.g., multiple plans under one MySQL® database service type).

Following registration of the local service catalogs 320 with the global service catalog 340, the global service catalog 340 will have a collection of services that can be used to help the service scheduler 342 to decide which of the computing clusters 302 should be used to deploy new workloads based at least in part on the dependent services utilized by the workloads. The customized service broker API can be used to expose functions of the global service catalog 340 to the service scheduler 342.

Once the service scheduler 342 decides where to deploy a given workload and which service plan should be used to provision dependent services of the given workload, such decisions may be sent to the global service catalog 340. The global service catalog 340 will generate a pair of private and public keys for each workload. The global service catalog 340 will then send provisioning requests to the local service catalogs 320 that provide the dependent services (e.g., with the local service catalogs 320 being selected based on the chosen plan for the dependent services), along with the public key and the name (or other identifier) of the workload that is going to be consuming the dependent services. The local service catalogs 320 will then provision the requested services, and make such provisioned services available on the multi-cluster service mesh 341. The multi-cluster service mesh 341 may be configured to only accept traffic from the workload with the name or other identifier that has the provided public key, so that only the authorized workload can consume the provisioned services.

Figure 4:
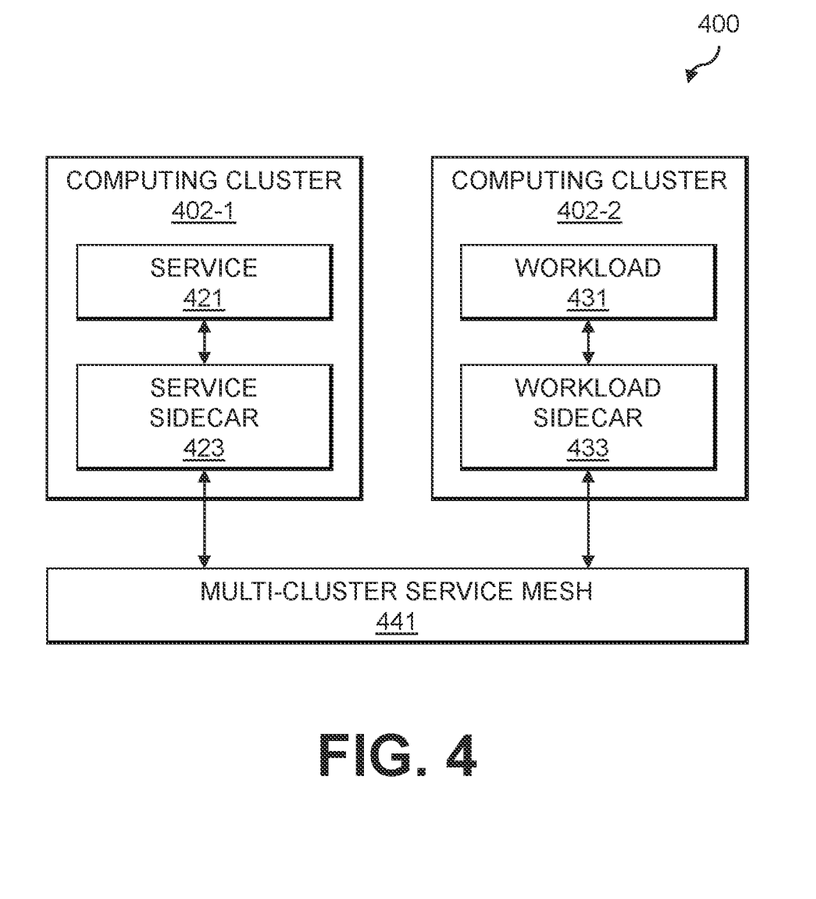
FIG. 4 shows communication between a workload and service via sidecar proxies that communicate over a multi-cluster service mesh in an illustrative embodiment.

FIG. 4 shows an architecture 400 of a provisioned service 421 on a computing cluster 402-1 that is a dependent service of a workload 431 deployed on a computing cluster 402-2. The service 421 and workload 431 have respective "sidecars" 423 and 433 which facilitate communication between the service 421 and the workload 431 via multi-cluster service mesh 441. The service sidecar 423 and the workload sidecar 433 may implement proxy servers that can redirect traffic based on policies defined by the multi-cluster service mesh 441. The proxy servers implemented by the service sidecar 423 and the workload sidecar 433 can handle application layer traffic in protocols such as HTTP. The service sidecar 423 is deployed along with the service 421, and listens to requests (e.g., from the workload 431) that are directed to the service 421. The service sidecar 423 will translate the original application layer request, and establish a secure connection with the target service 421. Similarly, the workload sidecar 433 is deployed along with the workload 431 and listens for requests directed to the workload 431 and translates them as needed.

The workload sidecar 433 will have a private key generated by the global service catalog (e.g., the global service catalog 340, not shown in FIG. 4), and the service sidecar 423 will have the corresponding public key and the name or other identifier of the workload 431. With this setup, only the workload 431 can access the service 421—even traffic from another location (e.g., another workload) with the private key would be rejected. If the service 421 needs to create credentials, a local service catalog (not shown in FIG. 4) on the computing cluster 402-1 will build a correct service configuration for provisioning. The necessary credentials are sent to the global service catalog, and such credentials will be encrypted by the provided public key. Once the global service catalog receives the encrypted credential, it will send this to the service scheduler (e.g., the service scheduler 342, not shown in FIG. 4). The service scheduler 342 is responsible for injecting this credential into the environment (e.g., the computing cluster 402-2) where the workload 431 is running, so that the workload 431 can access the credentials and use them to access the provisioned service 421 on the computing cluster 402-1. Once the workload 431 is finished (e.g., ceases execution, migrates to another computing cluster, etc.) and the service 421 is no longer needed, a deprovision request may be sent to the global service catalog 340 to deprovision the service 421. The global service catalog 340 can then terminate or destroy the service 421, as well as the service sidecar 423 and the workload sidecar 433.

The technical solutions described herein provide a number of technical advantages. Such technical advantages include dynamically provisioning services in a multi-cluster computing environment with a global service catalog (e.g., the global service catalog 340). Scheduling workloads in a multi-cluster computing environment is not always a static process, but may instead be a continuous process that is based on various factors such as latest user requests, resource availability in computing clusters that are part of the multi-cluster computing environment, network latency, etc. Advantageously, the technical solutions described herein can detect changes in such factors, and dynamically decide where to provision dependent services to increase overall resource utilization and efficiency in the multi-cluster computing environment, and to improve workload performance.

Dynamic access control in a multi-cluster computing environment is also enabled through the use of a multi-cluster service mesh (e.g., multi-cluster service mesh 341, multi-cluster service mesh 441). Accessing services in different facilities (e.g., different computing clusters of a multi-cluster computing environment) is a "pain point" for developers, due to the complexity of the IT systems (e.g., including managing access control lists for incoming traffic). The technical solutions described herein provide a multi-cluster service mesh that can free developers from having to deal with these and other issues, by dynamically granting and revoking permissions for specific workloads accessing specific services.

The technical solutions described herein further enable inter-cluster credential management in a multi-cluster computing environment, where such inter-cluster credential management may include cluster and service-specific credentials. Advantageously, service credentials may be dynamically regenerated for services, such as in the context of client or workload migration during multi-cloud (or other multi-cluster computing environment) orchestration optimization.

The global service catalog can also facilitate inter-cluster scheduling of workloads and their dependent services. The scheduling of workloads and their dependent services may involve many different factors, including but not limited to latency between computing clusters, service availability, service performance, etc., to make improved scheduling decisions. The global service catalog provides a channel for collecting service information from multiple local service catalogs, aggregating the collected service information, and sending the aggregated service information to a service scheduler that will utilize the aggregated service information to make intelligent decisions for the deployment of workloads and their dependent services across different computing clusters of a multi-cluster computing environment. The global service catalog can also be used to dynamically add and remove local service catalogs for different computing clusters that may provide different types of services. The ability to dynamically add (and remove) local service catalogs will increase the capabilities of the multi-cluster computing environment, and create mechanisms for third-party service providers to join the multi-cluster computing environment to build a greater services ecosystem.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for provisioning services on a multi-cluster service mesh of a multi-cluster computing environment utilizing a global service catalog will now be described in greater detail with reference to FIGS. 5 and 6. Although described in the context of system 100, these platforms may also be used to implement at least portions of other information processing systems in other embodiments.

Figure 5:
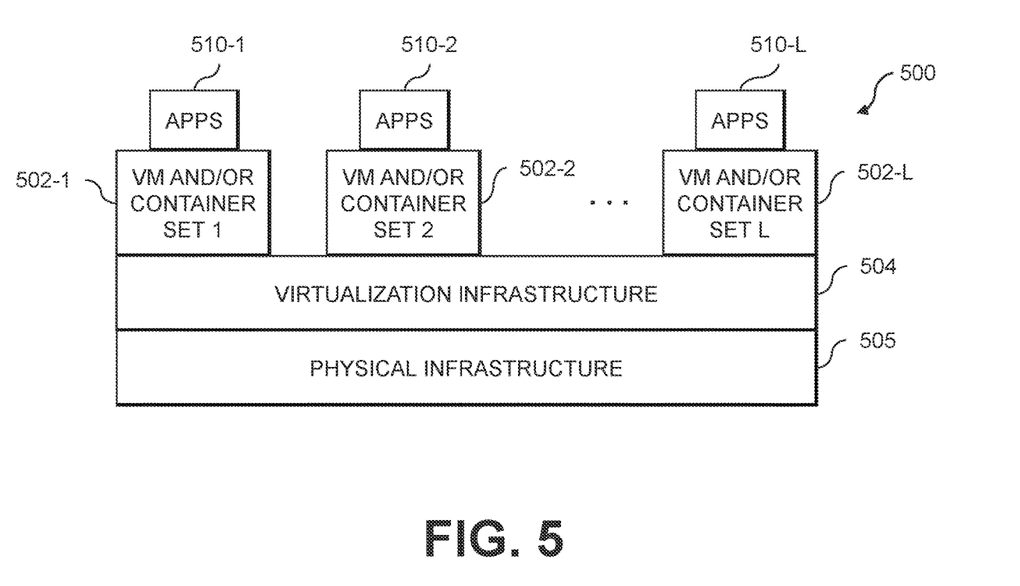
FIGS. 5 and 6 show examples of processing platforms that may be utilized to implement at least a portion of an information processing system in illustrative embodiments.
Figure 6:
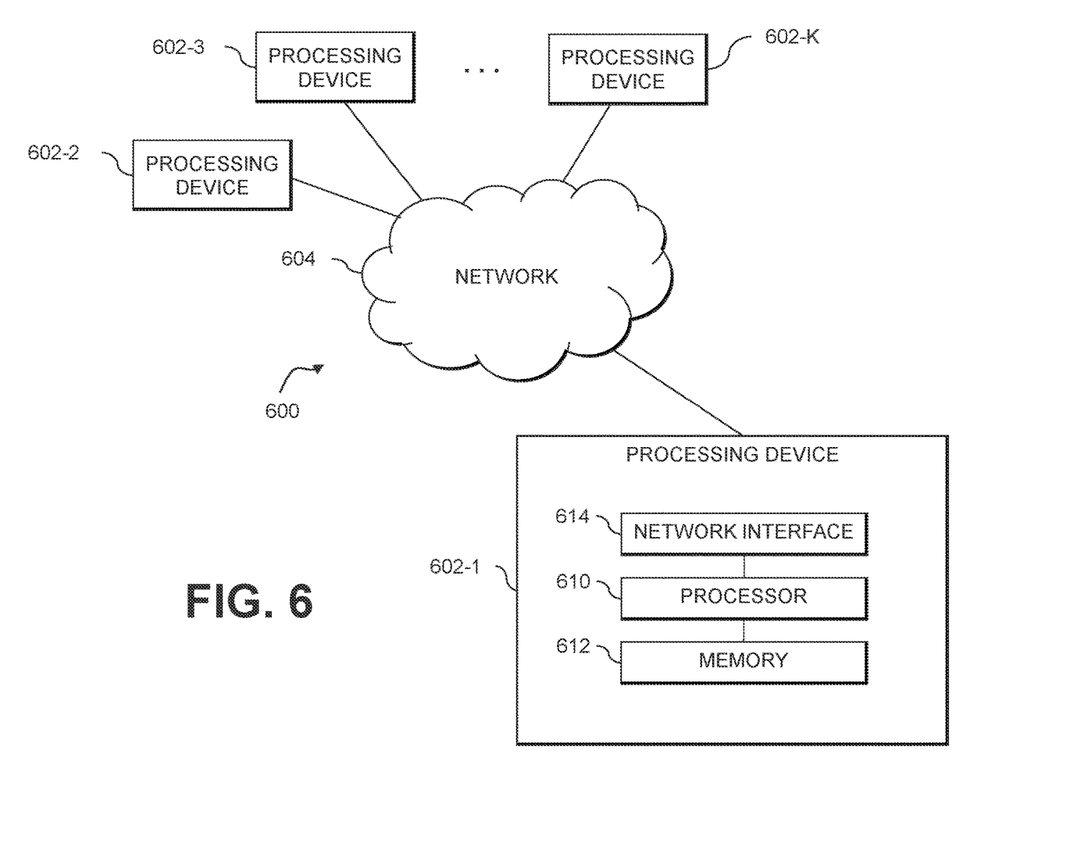

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for provisioning services on a multi-cluster service mesh of a multi-cluster computing environment utilizing a global service catalog as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, services, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   identifying one or more dependent services for a workload deployed in a first one of two or more computing clusters of a multi-cluster computing environment;

selecting, utilizing a global service catalog aggregating service information for sets of available services offered by at least two of the two or more computing clusters of the multi-cluster computing environment, a second one of the two or more computing clusters of the multi-cluster computing environment to utilize for provisioning at least a given one of the one or more dependent services for the workload; and     provisioning the given dependent service on a multi-cluster service mesh associated with the multi-cluster computing environment, wherein provisioning the given dependent service on the multi-cluster service mesh comprises configuring the multi-cluster service mesh to permit access by the workload on the first one of the two or more computing clusters of the multi-cluster computing environment to the given dependent service on the second one of the two or more computing clusters of the multi-cluster computing environment;

wherein the global service catalog is coupled between a service scheduler and a plurality of local service catalogs implemented on respective ones of the two or more computing clusters, the global service catalog being configured to collect via the local service catalogs respective sets of information characterizing respective sets of services provided by respective ones of the two or more computing clusters; and wherein the service scheduler interacts with the global service catalog via a service broker application programming interface to select the second one of the two or more computing clusters to utilize for provisioning the given dependent service, the provisioning of the given dependent service being carried out at least in part by the global service catalog interacting with the local service catalog of the second one of the two or more computing clusters under the control of the service scheduler.

2. The apparatus of claim 1 wherein the at least one processing device is further configured to perform the step of registering at least two local service catalogs maintaining information regarding sets of available services offered by the at least two of the two or more computing clusters of the multi-cluster computing environment with the global service catalog.

3. The apparatus of claim 2 wherein registering a given one of the at least two local service catalogs associated with a given one of the two or more computing clusters of the multi-cluster computing environment with the global service catalog comprises parsing a registration request for the given local service catalog, the registration request specifying an operator of the given one of the two or more computing clusters of the multi-cluster computing environment, a network address of the given local service catalog, and a private key of a key pair generated for establishing secure connection between the given local service catalog and the global service catalog.

4. The apparatus of claim 1 wherein the global service catalog is configured to periodically poll local service catalogs that maintain information regarding sets of available services offered by the at least two of the two or more computing clusters of the multi-cluster computing environment to update the sets of available services offered by the at least two of the two or more computing clusters of the multi-cluster computing environment.

5. The apparatus of claim 1 wherein the aggregated service information of the global service catalog comprises one or more consolidated service entries, at least a given one of the one or more consolidated service entries being associated with a given service type.

6. The apparatus of claim 5 wherein the given service type comprises at least one of: a database service type; a storage service type; a security service type; a hardware accelerator service type.

7. The apparatus of claim 5 wherein the given consolidated service entry identifies at least two of the two or more computing clusters of the multi-cluster computing environment that offer services of the given service type.

8. The apparatus of claim 5 wherein the given consolidated service entry identifies at least two service configurations of the given service type offered by at least one of the two or more computing clusters of the multi-cluster computing environment, the at least two service configurations comprising two or more different guaranteed levels of service of the given service type offered by the at least one of the two or more computing clusters of the multi-cluster computing environment.

9. The apparatus of claim 1 wherein the given dependent service comprises a given service type, and wherein selecting the second one of the two or more computing clusters of the multi-cluster computing environment to utilize for provisioning the given dependent service for the workload comprises selecting the second one of the two or more computing clusters of the multi-cluster computing environment from among at least two of the two or more computing clusters of the multi-cluster computing environment offering services of the given service type.

10. The apparatus of claim 9 wherein the second one of the two or more computing clusters of the multi-cluster computing environment is selected based at least in part on latency to the first one of the two or more computing clusters of the multi-cluster computing environment where the workload is deployed.

11. The apparatus of claim 1 wherein provisioning the given dependent service on the multi-cluster service mesh further comprises:

generating a key pair for the workload, wherein the generated key pair comprises a private key and a public key;

providing the private key of the generated key pair to the workload; and     providing the public key and a given identifier of the workload to the given dependent service.

12. The apparatus of claim 1 wherein provisioning the given dependent service on the multi-cluster service mesh further comprises:

receiving, from a local service catalog associated with the second one of the two or more computing clusters of the multi-cluster computing environment, one or more credentials for the given dependent service encrypted utilizing a public key of a key pair associated with the local service catalog;

decrypting, at the global service catalog, the one or more credentials for the given dependent service utilizing a private key of the key pair associated with the local service catalog, the private key being previously provided to the global service catalog during registration of the local service catalog; and injecting the decrypted one or more credentials into the first one of the two or more computing clusters of the multi-cluster computing environment where the workload is deployed.

13. The apparatus of claim 1 wherein the at least one processing device is further configured to repeat the selecting and provisioning steps dynamically in response to detecting one or more changes in available resources of at least one of the two or more computing clusters of the multi-cluster computing environment.

14. The apparatus of claim 1 wherein the at least one processing device is further configured to repeat the selecting and provisioning steps dynamically in response to migration of the workload from (i) being deployed in the first one of the two or more computing clusters of the multi-cluster computing environment to (ii) being deployed in at least one other one of the two or more computing clusters of the multi-cluster computing environment.

15. A computer program product comprising a non-transitory processor-readable storage medium having stored therein program code of one or more software programs, wherein the program code when executed by at least one processing device causes the at least one processing device to perform steps of:
identifying one or more dependent services for a workload deployed in a first one of two or more computing clusters of a multi-cluster computing environment;
selecting, utilizing a global service catalog aggregating service information for sets of available services offered by at least two of the two or more computing clusters of the multi-cluster computing environment, a second one of the two or more computing clusters of the multi-cluster computing environment to utilize for provisioning at least a given one of the one or more dependent services for the workload; and
provisioning the given dependent service on a multi-cluster service mesh associated with the multi-cluster computing environment, wherein provisioning the given dependent service on the multi-cluster service mesh comprises configuring the multi-cluster service mesh to permit access by the workload on the first one of the two or more computing clusters of the multi-cluster computing environment to the given dependent service on the second one of the two or more computing clusters of the multi-cluster computing environment;
wherein the global service catalog is coupled between a service scheduler and a plurality of local service catalogs implemented on respective ones of the two or more computing clusters, the global service catalog being configured to collect via the local service catalogs respective sets of information characterizing respective sets of services provided by respective ones of the two or more computing clusters; and
wherein the service scheduler interacts with the global service catalog via a service broker application programming interface to select the second one of the two or more computing clusters to utilize for provisioning the given dependent service, the provisioning of the given dependent service being carried out at least in part by the global service catalog interacting with the local service catalog of the second one of the two or more computing clusters under the control of the service scheduler.

16. The computer program product of claim 15 wherein provisioning the given dependent service on the multi-cluster service mesh further comprises:

generating a key pair for the workload, wherein the generated key pair comprises a private key and a public key;
providing the private key of the generated key pair to the workload; and
providing the public key and a given identifier of the workload to the given dependent service.

17. The computer program product of claim 15 wherein provisioning the given dependent service on the multi-cluster service mesh further comprises:
receiving, from a local service catalog associated with the second one of the two or more computing clusters of the multi-cluster computing environment, one or more credentials for the given dependent service encrypted utilizing a public key of a key pair associated with the local service catalog;
decrypting, at the global service catalog, the one or more credentials for the given dependent service utilizing a private key of the key pair associated with the local service catalog, the private key being previously provided to the global service catalog during registration of the local service catalog; and
injecting the decrypted one or more credentials into the first one of the two or more computing clusters of the multi-cluster computing environment where the workload is deployed.

18. A method comprising:
identifying one or more dependent services for a workload deployed in a first one of two or more computing clusters of a multi-cluster computing environment;
selecting, utilizing a global service catalog aggregating service information for sets of available services offered by at least two of the two or more computing clusters of the multi-cluster computing environment, a second one of the two or more computing clusters of the multi-cluster computing environment to utilize for provisioning at least a given one of the one or more dependent services for the workload; and
provisioning the given dependent service on a multi-cluster service mesh associated with the multi-cluster computing environment, wherein provisioning the given dependent service on the multi-cluster service mesh comprises configuring the multi-cluster service mesh to permit access by the workload on the first one of the two or more computing clusters of the multi-cluster computing environment to the given dependent service on the second one of the two or more computing clusters of the multi-cluster computing environment;
wherein the global service catalog is coupled between a service scheduler and a plurality of local service catalogs implemented on respective ones of the two or more computing clusters, the global service catalog being configured to collect via the local service catalogs respective sets of information characterizing respective sets of services provided by respective ones of the two or more computing clusters;
wherein the service scheduler interacts with the global service catalog via a service broker application programming interface to select the second one of the two or more computing clusters to utilize for provisioning the given dependent service, the provisioning of the given dependent service being carried out at least in part by the global service catalog interacting with the local service catalog of the second one of the two or more computing clusters under the control of the service scheduler; and wherein the method is performed by at least one processing device comprising a processor coupled to a memory.

19. The method of claim 18 wherein provisioning the given dependent service on the multi-cluster service mesh further comprises:
    generating a key pair for the workload, wherein the generated key pair comprises a private key and a public key;
    providing the private key of the generated key pair to the workload; and
    providing the public key and a given identifier of the workload to the given dependent service.

20. The method of claim 18 wherein provisioning the given dependent service on the multi-cluster service mesh further comprises:
    receiving, from a local service catalog associated with the second one of the two or more computing clusters of the multi-cluster computing environment, one or more credentials for the given dependent service encrypted utilizing a public key of a key pair associated with the local service catalog;
    decrypting, at the global service catalog, the one or more credentials for the given dependent service utilizing a private key of the key pair associated with the local service catalog, the private key being previously provided to the global service catalog during registration of the local service catalog; and
    injecting the decrypted one or more credentials into the first one of the two or more computing clusters of the multi-cluster computing environment where the workload is deployed.

* * * * *